TUNING DEVICE

Filed Nov. 6, 1951

INVENTOR.
HENRY R. HESSE

BY Darby & Darby

ATTORNEYS

United States Patent Office

2,765,447
Patented Oct. 2, 1956

2,765,447

TUNING DEVICE

Henry R. Hesse, East Paterson, N. J., assignor to Allen B. Du Mont Laboratories, Inc., Clifton, N. J., a corporation of Delaware Application November 6, 1951, Serial No. 255,108

1 Claim. (Cl. 333—82)

This invention relates to electrical tuning devices which may be made to resonate at various frequencies, and more particularly to such a device which has provisions for ganging and tracking with other similar units.

An object of the invention is to provide a variably tunable electrically resonant device having a predetermined rate of change of tuning.

Another object is to provide tunable electrically resonant devices which may be ganged together to obtain simultaneous tuning.

Other objects will be apparent to those skilled in the art.

In the drawing, Fig. 1 is an end view of a preferred embodiment of the invention, showing the tunable elements.

Figure 1:
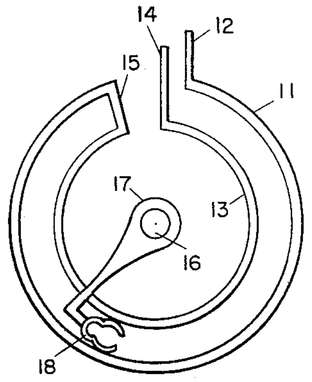
Figure 2:
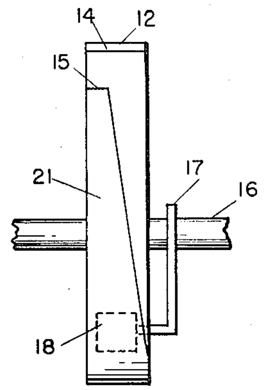
Fig. 2 is a side elevational view of the device of Fig. 1, showing means for obtaining tracking of the device.

The embodiment of Figs. 1 and 2 comprises an outer open or unclosed circular loop 11 of conductive material such as copper or silver having a terminal end 12 thereon, and an inner unclosed circular loop 13 concentrically positioned within the outer loop 11 and having a terminal end 14 thereon. The loops 11 and 13 are preferably connected together at the other ends 15 thereof remote from the terminals 12, 14, and are preferably formed from strip-like material but may, if desired, be formed from round wire. A tuning shaft 16 is positioned concentrically within the loops 11 and 13. An arm 17 is securely attached to the shaft 16 and extends laterally therefrom to engage a shorting slider 18 which resiliently engages the inner surface of the outer loop 11 and outer surface of the inner loop 13. The circular portion of one or both of the loop members may be tapered as indicated by the numeral 21.

A resonant circuit is provided between the terminals 12 and 14 by the inductance of the loops 11 and 13 and the capacitance therebetween. Movement of the slider 18 changes the effective electrical path-length between the terminals 12 and 14 and thus affects the tuning or resonance frequency of the device. The taper 21 of one or both of the loops affects the rate-of-change of the tuning. When the slider 18 is adjusted to narrower portions of the taper 21, inductance becomes relatively greater and the capacitance becomes relatively less, thereby affecting the rate of tuning. Where the taper is narrow, the rate of tuning change becomes greater. The taper may be in either direction and several tapered sections may be employed at any locations on one or both tuning loops. This control over the rate of tuning is particularly advantageous when a plurality of tuning units are arranged to be tuned together. By this means, the relative rates of tuning of various devices may be preadjusted so as to obtain proper tuning or tracking of the devices at all times. The ends 15 of the loops 11, 13 are preferably connected together as shown so that the untuned portion will form a closed loop. This construction minimizes any possibility of this untuned portion picking up the electric field of the tuned portion and undesirably resonating in accordance therewith, the reason being that a closed loop is tuned to a much higher frequency than is an open-end loop.

Figure 3:
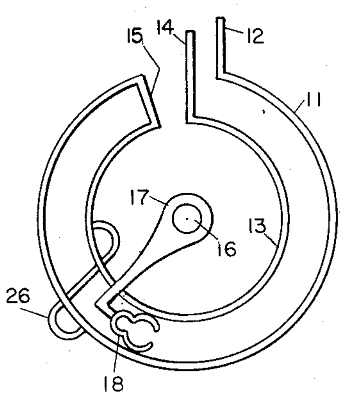
Fig. 3 is an end view of an alternative embodiment of the invention, showing the tunable elements and a means for obtaining tracking.
Figure 4:
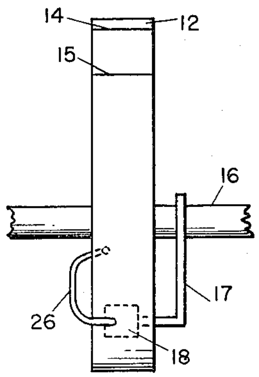
Fig. 4 is a side elevational view of the device of Fig. 3.
Figure 6:
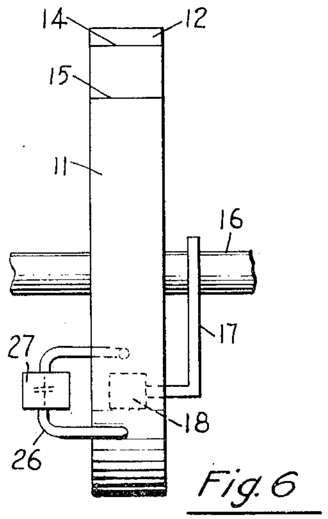
Fig. 6 is a side elevational view of an additional embodiment of the invention.

In the alternative embodiment of Figs. 3 and 4, the outer and inner loops 11 and 13, the terminals 12 and 14 thereon, the shaft 16, the arm 17 and the slider 18 are similar to the corresponding elements shown in Figs. 1 and 2. However, in this embodiment, the loops are not tapered, but instead, the rate of tuning is set in a predetermined manner by means of a conductive reactance strap 26 connected between the outer loop 11 and inner loop 13. The ends of the strap 26 may be fastened to said loops by means of soldering or by a clamping or pressure means which insures good electrical connections. The strap 26 may be shaped to have a desired amount of inductance which is connected across and between the loops 11 and 13. Alternatively, the strap 26 may comprise a capacitance unit 27 connected across the loops 11, 13, as shown in Fig. 6. The ends of the strap 26 may be connected at correspondingly similar peripheral positions, or at different peripheral positions as illustrated. The ends of the strap 26 are preferably connected to the outside surface of the outer loop 11 and to the inside surface of the inner loop 13, as shown, so that the surfaces of the loops upon which the slider 18 slides will be unobstructed.

When the slider 18 is moved beyond the position of the reactive strap 26, the rate of change of tuning is different than it is in the region between the strap 26 and the terminals 12, 14. The strap 26 provides a shunt current path across the loops 11 and 13. When the slider 18 is in the aforementioned position beyond the strap 26 from the terminals 12, 14, and the strap is an inductance, the rate of change of tuning becomes relatively less because of fixed inductive shunt current path provided. If the strap 26 is a capacitance, the aforementioned rate of change becomes relatively greater.

In certain applications, it would be desirable to have one or both ends of the strap 26 slidably attached to the loops 11 and 13 so that tracking adjustment may be made easily. A plurality of straps 26 may be employed, if desired, at various positions on the tuning loops 11 and 13.

Figure 5:
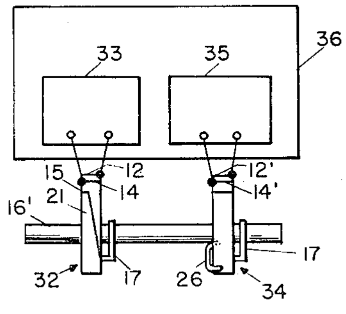
Fig. 5 is a diagrammatic illustration of two of the novel tuning units connected to electrical circuits to function simultaneously in tandem.

Fig. 5 shows two devices, as described, connected in tandem on a single tuning shaft 16'. One of said devices 32 is connected to terminals of an electrical tuned circuit 33 which may be, for instance, an oscillator circuit. Another of the devices 34 is connected to electrical tuned circuits 35 which may be for instance, a superheterodyne mixer circuit. The circuits 33 and 35 may be part of a receiver 36 in which it is desired that the oscillator 33 frequency should be tuned at a fixed frequency higher, or lower, than the tuning frequency of the mixer 35, and the resonant frequencies of both circuits should be tunable over a wide range of frequencies, yet always maintaining a fixed frequency difference between the two circuits. The desired difference in tuning frequency of the circuits 33 and 35 may be obtained, for instance, by angularly offsetting one of the arms 17 from the position of the other arm 17' on the shaft 16'.

Tracking, or the proper fixed frequency difference, can be maintained throughout the tuning range by proper adjustment of the tracking means which may comprise the tapered loops 21 of the embodiment of Figs. 1 and 2, or the reactive shunting strap 26 of the embodiment of Figs. 3 and 4, or a combination of tapered loops and shunting straps in a single unit.

It will be apparent that a desideratum of the invention is to provide tracking of a tuning device over a wide range of tuning frequencies by utilizing a means for changing the rate of tuning of the device at a predetermined position thereon.

While preferred embodiments have been shown and described, it will be apparent to those skilled in the art that certain changes may be made therein, which none-the-less will remain within the scope of the invention as defined by the following claim.

What is claimed is:

A tuning device having a predetermined rate-of-change of tuning comprising a pair of fixedly positioned concentric elongated conductive strips radially disposed about an axis, a pair of terminals respectively connected to one end of each of said strips, the other end of said strips being electrically connected to each other, both said strips having a given width throughout a portion of its length, the remaining portion of the length of said strips being tapered towards said other end, a pair of contacts respectively contacting the vis-a-vis-surfaces of said strips and a conductive reactive strap connected to the outer surface and inner surface respectively of said pair of strips to provide an unobstructed path for said contacts whereby when said contacts slide along said strips a tunable circuit is provided having a predetermined rate-of-change tuning, said rate-of-change tuning being determined by said taper and said reactive strap.

References Cited in the file of this patent

UNITED STATES PATENTS

| | | |
|---|---|---|
| 2,113,758 | DeVries | Apr. 12, 1938 |
| 2,126,541 | De Forest | Aug. 9, 1938 |
| 2,262,365 | Kinn | Nov. 11, 1941 |
| 2,463,417 | Overacker | Mar. 1, 1949 |
| 2,482,393 | Wilburn | Sept. 20, 1949 |
| 2,522,370 | Guanella | Sept. 12, 1950 |
| 2,543,042 | Miller | Feb. 27, 1951 |
| 2,543,560 | Thias | Feb. 27, 1951 |
| 2,551,228 | Achenbach | May 1, 1951 |
| 2,627,579 | Wasmansdorff | Feb. 3, 1953 |